United States Patent Office 2,886,377
Patented May 12, 1959

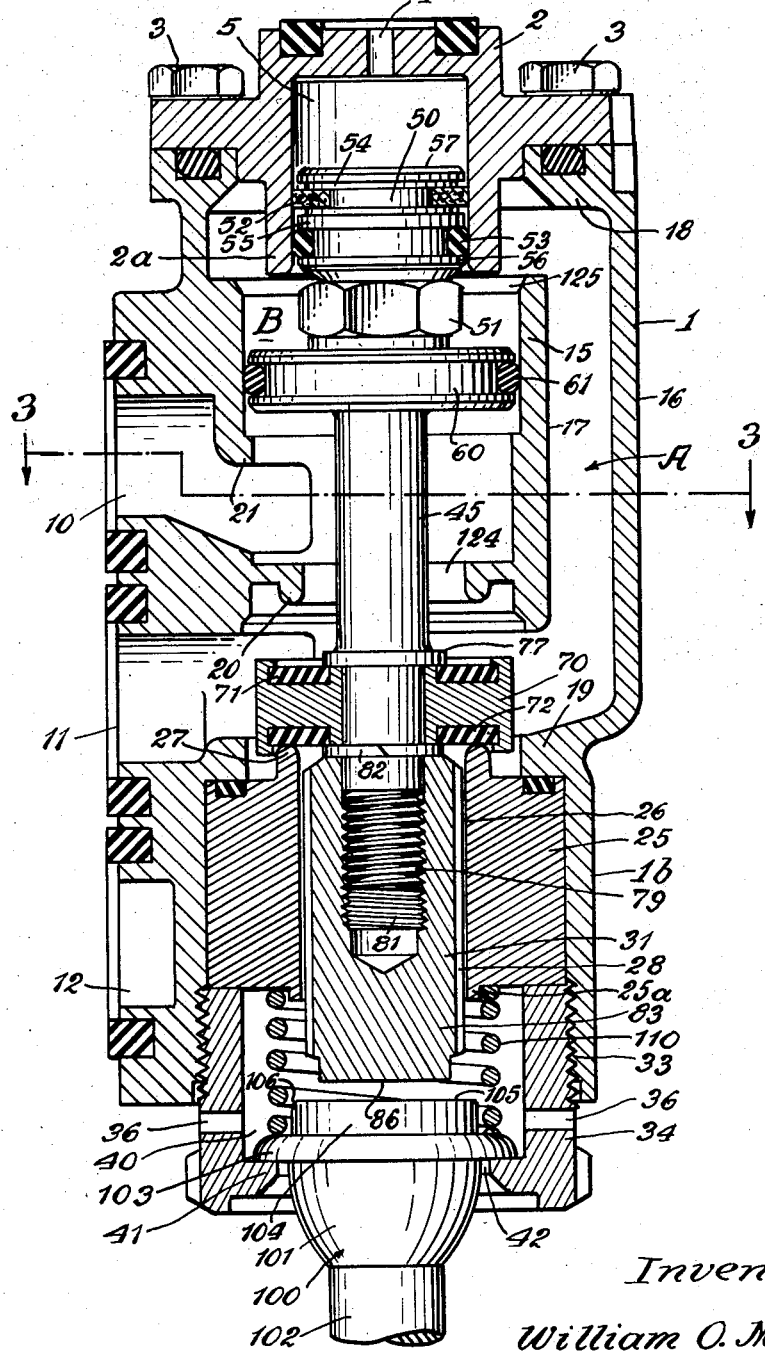

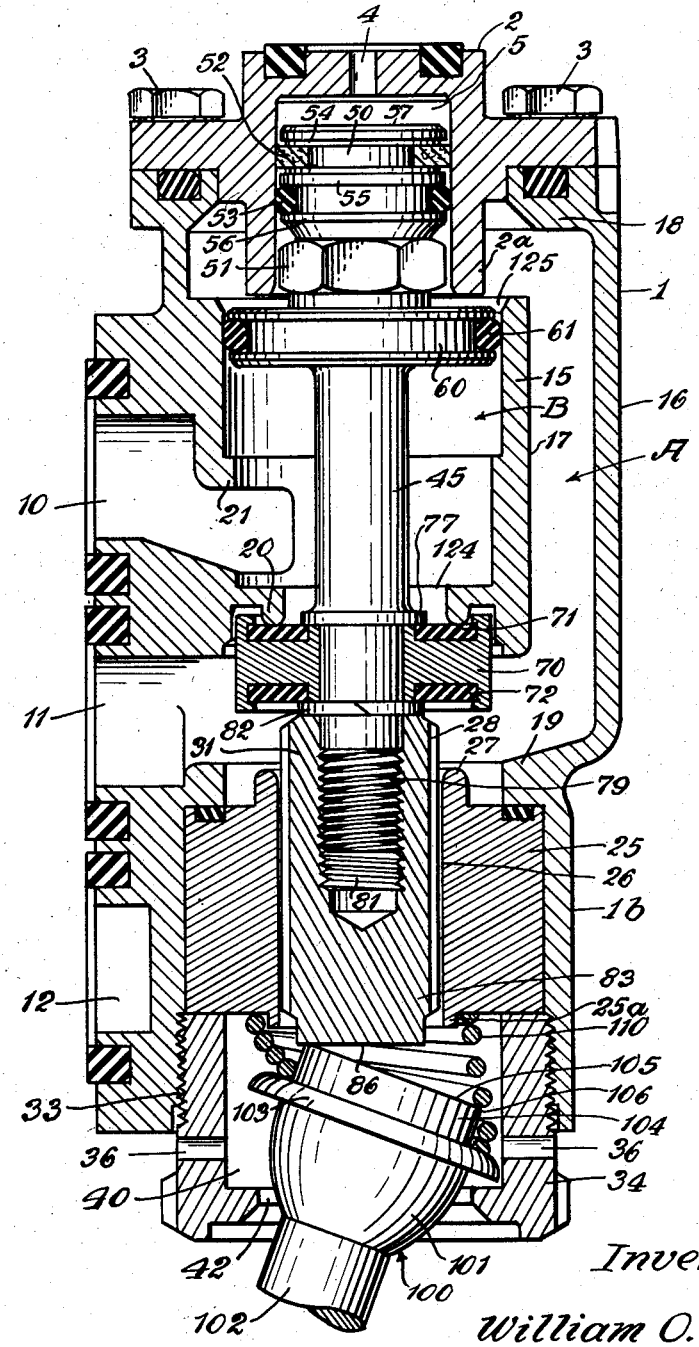

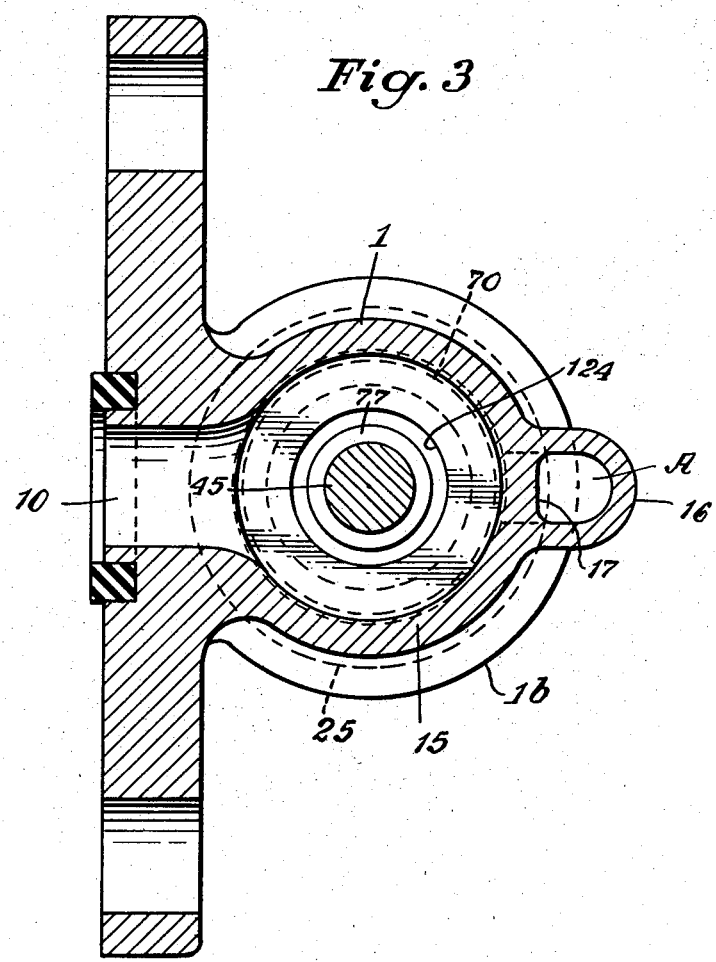

2,886,377

CONTROL VALVE

William O. Martin, Fort Smith, Ark., assignor to Crerar, Adams & Co., Chicago, Ill., a corporation of Illinois Application November 14, 1955, Serial No. 546,524

4 Claims. (Cl. 303—68)

The invention relates to improvements in air brakes for railroad cars and the like and has for one object to provide an air brake control and relief valve which will, after the car has been cut out of a train, permit the brakes to be released while maintaining pressure in the auxiliary air reservoir in the car.

In general there is on each car an auxiliary reservoir for compressed air, at least one brake cylinder, and the so-called AB valve which controls brake application. The engine supplies air under pressure through the brake pipe to fill the auxiliary reservoir on each car in the train with pressure of, for example, seventy pounds per square inch. Until this has been done, the train cannot be properly operated. After each reservoir has been filled, control of pressure in the brake pipe by the engineer in the cab works through the AB valve to control brake applications.

While for convenience it will be understood that the term "auxiliary reservoir" as used earlier, wherever used, refers also to the emergency reservoir commonly installed on railroad cars. The two reservoirs are often referred to as the "combined reservoir." Since the valve of this invention controls the air in both the auxiliary and the emergency reservoir, the term "auxiliary reservoir" wherever used herein should be understood as including the "combined reservoir."

When the pressure in the brake line for any reason falls below a predetermined point, the AB valve on each car admits pressure from the auxiliary reservoir, to the brake cylinder, to apply the brakes and hold the car in place. When it is desired to break up the train, this brake pressure must be relieved, and so a manually operated valve has in the past been provided with which the brakeman can bleed off the pressure from the auxiliary reservoir to release the brakes. The car can then be moved, but when it is again assembled in a train, time must be taken to permit air in the brake pipe to build up pressure in the auxiliary reservoirs in the train before it can be operated.

In copending application, Serial Number 258,702, filed November 28, 1951, for "Railroad Air Valve," now Patent No. 2,735,726, of which the present inventor is a joint inventor, there is disclosed a control valve assembly which makes it possible for the brake-man to release the pressure on the brake cylinder without easing the pressure in the auxiliary reservoir, so that when the car is again assembled in a train, it is ready to operate without waiting for build up of air pressure in all the reservoirs. This is accomplished by the provision of a separate automatic control valve which may be manipulated to relieve the pressure on the brake cylinder, but which will at all times hold the pressure in the reservoir.

It is a purpose of my present invention to provide certain improvements in the above-mentioned railroad air valve.

Another purpose is to provide a unitary housing and cylinder in a railroad air valve such as that disclosed in the copending application referred to above.

Another purpose is to provide a dual set of pistons and cylinders to be acted upon by separate sources of fluid pressure in a railroad air valve.

Another purpose is to provide an improved railroad air valve operating means.

Another purpose is to provide a universal type of railroad air valve operating means which shall be effective when operated in a plurality of directions.

The invention is illustrated more or less diagrammatically in the accompanying drawings, wherein—

Figure 1 is a side elevation in cross-section;

Figure 2 is a view similar to that of Figure 1 with the parts in another position, and Figure 3 is a view taken on the line 3—3 of Figure 1.

Like parts are indicated by like characters throughout the specification and drawings.

Reference is made to the above-mentioned copending application wherein there is shown and described a railroad brake cylinder, an auxiliary air reservoir, a brake piston rod, an AB valve, a train brake pipe and appropriate branch pipes. The arrangement so disclosed is well known. At least one brake cylinder is normally carried on each railroad car and contains a piston adapted to be actuated by air pressure to apply the brakes of the car through a brake piston rod. The train brake pipe extends through the train from car to car and is supplied with air from the engine. A branch pipe leads from the train brake pipe to the AB valve. Another branch pipe normally connects the AB valve to the brake cylinder. The railroad air or control valve disclosed herein and in said copending application is mounted on the AB valve and a low pressure pipe connects this control valve to the brake cylinder to control the air flow between the AB valve and the brake cylinder. The control valve is also connected to the train brake pipe through a separate branch pipe. The auxiliary reservoir normally has two chambers separately joined to the AB valve by appropriate branch pipes.

Since all of the items discussed immediately above may be fully understood by reference to the above-mentioned copending application, they are not shown herein and will not be further discussed except insofar as may be necessary to the explaining of the operation of the structure disclosed herein.

Referring now to the details of the control valve or auxiliary valve illustrated herein, and particularly to Figure 1, the numeral 1 generally illustrates a valve housing. The valve housing 1 is closed at its upper end by a head 2 held in place by fasteners 3. Head 2 has an axially disposed passage 4 in its upper wall which communicates with a downwardly open cylinder 5 formed in the head 2 and generally axially aligned with the housing 1.

Extending laterally through the wall of the housing 1 is a high pressure inlet or passage 10. An outlet passage 11 may extend laterally through the wall of the housing 1 adjacent and in alignment with the inlet 10. 12 is merely a well formed in the wall of the housing 1 for ease in the lateral formation of a passage therethrough, should such be desired. It will be understood that the inlet passage 10 is arranged for connection to the AB valve and the outlet passage 11 is arranged for connection to a branch pipe leading to a brake cylinder, while the passage 4 is arranged for connection to the air brake pipe in order to supply brake pipe pressure to the cylinder 5. Formed integrally with the housing 1 and in axial alignment therewith is a cylinder 15 disposed intermediate the upper and lower ends of the housing 1 and having a substantial portion of its cylindrical outer surface spaced inwardly from the opposed portions of the vertical housing wall 16. The element 15 may be described as a valve cage or hollow cylinder. It will be understood that the cylinder 15, as is shown in Figures 1 and 2 is in axial alignment with the well or downwardly open cylinder 5 in the head 2.

The wall 17 of the cylinder 15 is downwardly spaced from an inwardly extending upper annular flange 18 of the housing 1 and the wall 17 is inwardly spaced from the side wall 16 of the housing 1. Similarly, the lower end of the wall 17 is upwardly spaced from a lower inwardly extending annular flange 19 of the housing 1. An annular upper valve seat 20 may be integrally formed with the cylinder 15 adjacent the lower edge thereof and positioned within the cylinder 15. An inwardly extending annular shoulder 21 may be formed integrally with the cylinder 15 at a point intermediate its upper and lower ends.

Socketed within a lower hollow portion 1b of the housing 1 is a cylindrical sleeve 25 having a central aperture 26 carrying an upwardly directed annular valve seat 27. Grooves 28 extend longitudinally in the wall of an elongated nut or block 31 to provide one or more axially directed air passages. The lower inner wall of the portion 1b is threaded as at 33 to receive an end member 34. The plug 34 may be threaded into the threads 33 and brought up against the sleeve 25 upwardly against the lower surface of the flange 19. The end plug 34 has a laterally disposed set of passages 36 formed in its annular wall to communicate with an inner chamber 40 which is upwardly open against the lower surface of the sleeve 25. An inwardly extending annular flange 41 may be formed integrally with the end member 34 adjacent its lower end, as the parts are shown in the drawings and may define an aperture 42 communicating with the chamber 40.

A rod element 45 may be positioned generally centrally within the housing 1 for reciprocal movement therein. A first piston element 50 is mounted in axial alignment with and operating engagement with the upper end of rod 45. The element 50 may include a piston ring or seal 52 and a seal ring 53 carried and held in position by a set of annular rings 54, 55, 56. The element 50 is positioned for reciprocal movement within the chamber 5, the rings 52, 53 being held in engagement with the cylindrical inner wall defining the chamber 5. The annular upper end surface 57 of the element 50 is in position to receive and be acted upon by a fluid entering the chamber 5 through the passage 4 connected to a brake pipe.

Secured to the rod 45, as by the nut 51, for reciprocal movement within the cylinder 15 above the shoulder 20 is a second piston element 60 which may carry an annular seal member 61 in contact with the inner cylindrical wall of the cylinder 15.

The valve seats 20, 27 are in substantial axial alignment and are spaced apart. Positioned on the rod 45 for reciprocal movement between the valve seats 20, 27 is a valve member 70. The valve 70 may take the form of the disk illustrated in the drawings and may have secured to its opposite annular faces the annular packing rings 71, 72 which may be formed of neoprene or similar material as shown in the drawings, the packing ring 71 is positioned to engage the downwardly disposed valve seat 20 when the valve 70 is in its uppermost position and the packing ring 72 is positioned to seat upon the valve seat 27 when the disk 70 is in its lowermost position.

The rod 45 has a threaded lower end 79 extending beyond the disk valve 70. The nut element 31 may have an inwardly threaded well 81 adapted for engagement with the threads of the lower piston rod portion 79. The nut 31 may be brought up on the threaded end 79 to press a split ring 82 against a lower central portion of the disk 70 to clamp the disk 70 against the lower surface of a shoulder 77 on the rod 45. The nut element 31 is positioned for reciprocal movement in the aperture 26 of the valve seat sleeve 25 and has lower body portion 83 extending downwardly and beneath the sleeve 25 to a position within the chamber 40 of the end member 34.

A manually operable member 100 has a generally semi-spherical upper portion 101 and a lower handle portion 102, a portion of which is shown in the drawing. It will be realized that the handle portion 102 could be formed in a variety of shapes without departing from the nature and scope of my invention. An annular outwardly extending collar or supporting flange 103 is secured adjacent an upper edge of the spherical portion 101 and a generally cylindrical upwardly extending camming portion 104 is positioned above the shoulder 103. The portion 104 has a generally flat upper surface 105 spaced a short distance beneath the lower end surface 86 of the downwardly projecting nut portion 83. The portion 104 may have its upper peripheral circumferential edge 106 rounded as indicated in the drawings, the purpose of which will appear hereinbelow. A spring 110 may be positioned within the chamber 40 of the plug 34 and may have its upper end in engagement with the lower annular surface of the sleeve 25. The upper end of the spring 110 may surround and be positioned by a downwardly depending annular skirt 25a positioned centrally on the sleeve 25 and surrounding the open lowered end of the bore 26. The lower end of the spring 110 may surround and be positioned by the camming element 104 and may press against the upper surface of the supporting ring or flange 103. It will be realized that the supporting ring 103 has its lower annular surface resting upon and supported by the upper annular surface of the inwardly extending flange 41. As best seen in Fig. 2, when the handle 102 is tilted one side only of the spring 110 is compressed, the remainder of the spring remaining open to permit passage of air from the exhaust channel 26 in the block 31 through the spring 110 and thus to the exhaust outlets 36.

The passage 10 places the area within the cylinder 15 beneath the piston 60 in communication with the AB valve and thus with the auxiliary and emergency reservoirs, by means of a branch pipe (not shown). The passage 11 may be connected, for example, to a pipe (not shown) to place the space A in communication with a brake cylinder. The space A includes the area within housing 1 above, alongside and beneath the cylinder 15. The diameter of the rod 45 is substantially less than the inside diameter of the annular valve seat 20 thereby creating a passage 124 placing the area within the cylinder 15, and thus the AB valve, in communication with the space A and and a brake cylinder. The space A is created by the spacing of the wall 17 of the cylinder 15 beneath the flange 18 of the housing 1, inwardly from the wall 16 of the housing 1 and upwardly from the flange 19 of the housing 1. As seen in the drawings, it will be realized that the disk valve 70 is reciprocal within the lower portion of the space A and that the space A is at all times in communication with the passage 11. The depending cylindrical central portion 2a of the head 2 has an outside diameter less than the inside diameter of the cylinder 15 which has its upper edge adjacent the lower edge of the portion 2a, thus creating an annular passage 125 placing in communication the space A and a space B within the cylinder 15 above the piston 60. Thus, when the valve 70 is moved off the seat 20 a passage is created placing the area beneath the piston 60 in communication with the area above the piston 60 through the passage 124 about the rod 45 in seat 20, space A and passage 125. As is best seen in Figure 2, the outside diameter of the nut 31 is less than the inside diameter of the channel or aperture 26 thus creating an exhaust passage placing the space A and passage 11, when the valve disk is off its seat 27, in communication with the chamber 40 in the member 34 and, through the passages 36, with the atmosphere.

The use and operation of my invention are as follows:
When air is applied to the brake pipe, the auxiliary valve as shown in Figure 1 automatically opens a passage between the AB valve and the brake cylinder so that the engineer is able to control the train in the usual manner, just as if the auxiliary valve was not in existence. This action results from the presence of brake pipe pressure in chamber 5 above the piston 50, since the combination of the pressures upon the surfaces 57, 71 is greater than that upon the under-surface of the differential piston 60, and the rod member is caused to move downwardly thus opening the valve passage 124 and bringing the inlet 10 into communication therethrough with the outlet 11. Under these circumstances, changes in the pressure of the air in the train pipe line brought about by the engineer so as to cause the AB valve to control brake operation do not upset in any way the setting of the auxiliary valve. The auxiliary valve maintains a clear passage for air between the AB valve and the brake cylinder, the differential pressure created by fluid on piston 50 being sufficient to maintain the parts as shown in Figure 1 in conjunction with the fluid pressure on the upper surfaces of members 60 and 70.

When pressure is released entirely from the train brake lines, the auxiliary valve remains in place, permitting continued brake application by the AB valve of the air under pressure in the reservoir.

When it is desired to move the car, a manipulation of the release lever handle 102 unseats the auxiliary valve by means of the camming surfaces 105, 106 to break the connection between the AB valve and the brake cylinder, but does not permit escape of air from the reservoir through the AB valve to atmosphere. It makes no difference how often the releasing lever is operated, because once it has been operated to move the valve into the position disconnecting the AB valve and the brake cylinder, as shown in Figure 2, nothing can happen at the car to change that situation. The only thing that would change the situation would be application of pressure again to the brake pipe.

If by accident the release lever should be manipulated while pressure was on the brake pipe there would be an escape of air, but when the lever is released, the valve resumes its operating position and the brake system would operate as before.

Under these circumstances, there is no possibility of air being lost from the reservoir while the car is not connected with the train, but when the car is connected in the train with the engine, the operation is just as if the auxiliary valve were not in existence. Nothing can happen to the auxiliary valve to apply the brakes and the auxiliary valve is normally in the position where the AB valve can apply the brakes.

The release or auxiliary control valve is altogether separate from the AB valve. There is a separate connection between the release valve and the train pipe and a direct passage through a valve controlled port from the connection between the release valve and the AB valve to the connection between the release valve and the brake cylinder.

There is a single longitudinally movable integral piston and valve member reciprocally mounted in the release valve housing. Air pressure from the train pipe independent of the AB valve holds the release valve in such position that the free passage between the AB valve and the brake cylinder is not interrupted. There is a vent in the release valve housing which is closed by the piston valve under these circumstances. The actuating piston is exposed on both sides to the pressure from the AB valve and on the valve side to seat the valve to close the vent. It is also exposed to train pipe pressure in chamber 5 which holds it seated.

When train pipe pressure is relieved because the car is disconnected from the train, air pressure from the AB valve balanced on both sides of the piston leaves the relief valve seated and pressure remains on the brake cylinder.

If the brakeman wants to move the car, he actuates the handle 102 in any chosen direction to manually, mechanically and by a positive camming action, displace the valve and piston against AB valve pressure. The minute he does this, the release port 26 opens and the brake cylinder exhausts to atmosphere. At the same time the release valve closes the passage 124 to the brake cylinder and the vent from cylinder 15 and the AB valve. The upward movement of the piston uncovers the port 26 so that pressure above the piston also exhausts through space A to the outside air but pressure from the AB valve on the underside of the piston holds the valve closed, the valve having smaller cross-sectional area than the piston. Thus the pressure from the AB valve holds the release valve in the brake cylinder release, reservoir-closing position. The car can then be moved but no further air is lost through the AB valve and no manipulation of the handle 102 and elements 101—106 thereafter can affect the valve.

When pressure is put on the train pipe again, this pressure automatically overcomes the pressure from the AB valve, closes the vent, and opens the connection from the AB valve to the brake cylinder.

This is all accomplished with a single moving part. The piston opens and closes the necessary ports to permit venting of the piston itself and to permit balancing of pressures above and below the piston. The valve carried by the piston is a two-way valve, in one position it closes the vent and in another position it opens the vent and closes the connection between the AB valve and the brake cylinder.

With the air brake system in running condition, pressure in the brake pipe having built up the pressure in the reservoirs on each car, there is a balance of pressure between the reservoirs and the brake pipe and the AB valve is in release condition. Under these circumstances, there is no pressure on the air brake control and relief valve, the pressure reaching passage 10 being at atmospheric.

When the train brakes are applied, pressure in the train brake pipe and thus in chamber 5 is reduced. The pressure in the auxiliary reservoir exceeds the pressure in the brake pipe which actuates the AB valve and applies the brake by making a connection through the control valve from the auxiliary reservoir to the brake cylinder to apply the brakes.

As long as there is any pressure in the train brake pipe, there is always pressure in the chamber 5 so that the valve 70 is always forced by such pressure down against its lower seat 27, as in Figure 1. Under these circumstances, there can be no continuing unintended operation of the brake because if the lever 102 should be manipulated, the minute it is let go the pressure in chamber 5 immediately resets the valve 70.

The above arrangement insures automatic operation. When the pressure drops in the train brake pipe, for example when a car is disconnected from the train, the pressure in the auxiliary reservoir actuates the AB valve to open the connection between the reservoir and the brake cylinder. The brake is applied and remains applied under the pressure of the auxiliary reservoir. When it is thereafter desired to move the car, the operator manipulates the lever 102 so that the control valve assumes the position of Figure 2, releasing the pressure on the brake cylinder, but closing off any escape of pressure from the auxiliary or emergency reservoir.

The air pressure does this work without relying on springs or special valve parts or any special adjustments and when the car is coupled back into the train and pressure is applied to the chamber 5, the control valve is returned to the position of Figure 1, no further action being required by the train crew or anyone else. This avoids the dangerous possibility of starting the car in a train with the bleeder valve open and no brakes on the car.

Considering Figure 1, our valve is in the train operating position, the valve 70 seats on the seat 27 to provide an unobstructed passage between the brake cylinder and the reservoirs through the AB valve and the control valve. The bypass 125 allows air under pressure to enter the space above the piston 60 so that the pressure from the train pipe entering chamber 5 and the pressure entering the passage 10 from the AB valve both unite to hold the valve 70 in the train operating position.

Piston 60 is of larger cross-sectional area than the exposed portion of valve 70 so, since pressure is balanced both above, through space A, and below the piston 60 by air entering through the AB valve, there is no tendency for piston 60 to rise and the pressure on valve 70 exerted by the air in the brake cylinder insures that valve 70 will remain in the train operating position of Figure 1. When the pressure in the train pipe and chamber 5 drops and the operator may easily move the lever 102 to raise the valve 70 to the position of Figure 2, then the pressure is only on the underside of piston 60 and the valve remains in the position of Figure 2. As this is done, the pressure in space A bleeds out through passage 26, 40, 36. This situation continues until pressure is again delivered to chamber 5.

After the member 100 has been tilted to set the valve 70 on its seat 20, the pressure beneath the piston 60 from the AB valve is effective to hold the valve on its seat and to hold the entire structure 45, 31, 70, 60, and 50 in its uppermost position, the chamber 5 being devoid from the pressure of the train brake pipe. The spring 110 is effective to return the element 100 to the position shown in Figure 1, operation of the manually operable means 100 being required only momentarily. When the valve 70 is on its lower seat 27, the arrangement of the parts is such as to provide a clearance between the end surface 86 and the upper surface 105 of the means 100. Since the operation of the valve operating means involves merely the tilting of the element 100 at some point on the flange 41, the shoulder 103 having a generally convex upper surface and a generally flat bottom surface, no opportunity exists for jamming the means 100 in a valve operating position.

I claim:

1. An automatic control valve for railroad air brake systems having an air brake pipe, a reservoir of air pressure and a brake cylinder, said control valve comprising a housing, an inwardly open cylinder at one end of and within said housing, an inlet passage placing said cylinder in communication with said air brake pipe, a piston mounted for reciprocation within said cylinder, a second cylinder positioned in said housing in axial alignment with said first cylinder, said second cylinder being open at its opposite ends, one of the open ends of said second cylinder being positioned adjacent the open end of said first-named cylinder, the opposite open end of said second cylinder defining a valve passage, an inlet passage in said housing placing said second cylinder in communication with said reservoir, a rod mounted for reciprocatory movement within said housing and extending through said valve passage, a differential piston mounted on said rod for reciprocation within said second cylinder and having its larger surface exposed to air pressure entering said second cylinder through said reservoir inlet, an outlet in said housing for connection to said brake cylinder, said valve passage being positioned to place said reservoir inlet and the area within said second cylinder beneath the larger surface of said piston in communication with said outlet, a passage in said housing placing the opposite open ends of said second cylinder in communication with each other and the area within said second cylinder beneath the larger surface of said differential piston in communication with said outlet, an exhaust port in said housing in communication with said channel passage, a double-acting valve mounted on said rod and positioned to close said valve passage when said rod is in one position and to close said exhaust port when said rod is in another position, manually operable means for moving said rod toward valve-passage-closing position, said first-named piston being positioned for operating engagement with said rod and movable in response to air-brake-pipe pressure entering said first-named cylinder in a direction to urge said rod toward valve-passage-opening position, said exhaust port being effective to exhaust simultaneously the area within said second cylinder above the smaller surface of said differential piston and said brake cylinder outlet.

2. A control valve for railroad air brake systems having an air brake pipe, a reservoir of air pressure and a brake cylinder, said control valve comprising a housing having inlets communicating with said brake pipe and reservoir and an outlet communicating with said brake cylinder, means movable in said housing in one direction in response solely to pressures entering said housing from said air brake pipe and said air reservoir, said last-named means comprising a pair of axially aligned cylinders, a rod mounted for reciprocation in said cylinders, a valve seat at one outer end of one of said cylinders, an exhaust port spaced from said cylinders in said housing and axially aligned with said valve seat, a double-acting valve mounted on said rod and dimensioned to alternately close said valve seat and said port, said rod extending through said valve seat, means for causing axial movement of said rod to move said valve between said valve seat and said exhaust port, comprising a pair of pistons, each of said pistons being mounted in one of said cylinders and having an operating engagement with said rod, one of said pistons being movable in response to pressure entering said housing from said air brake pipe to urge said rod in a direction to close said exhaust port, the other of said pistons being positioned to be acted upon by air entering said housing from said reservoir to move said rod in a direction seating said valve upon said valve seat, passage means in said housing placing the opposite surfaces of said last-named piston in communication with each other through said valve seat, said exhaust port and said outlet being in communication with said housing passage, and manually operable means for moving said rod in a direction to seat said valve upon said valve seat.

3. In combination, a control valve comprising a valve passage and an exhaust port in said housing, a housing, a rod mounted for reciprocation within said housing, a valve member on said rod and movable therewith alternatively in one direction to close said valve passage and in the opposite direction to close said exhaust port, and manually operable means for moving said rod toward valve-passage-closing position, said means comprising a housing-closure member secured to said housing and defining a chamber therein, said exhaust port communicating with said chamber, an exhaust outlet in said housing closure member communicating with said chamber, said rod having a portion extending into said chamber, a manually operable handle element having a portion extending through the wall of said closure member and into said chamber for movement into engagement with said rod portion, a flange on said handle portion within said chamber, a flange on said closure member, said handle flange being seated upon said closure member flange, a coil spring surrounding said rod portion within said chamber and surrounding said exhaust port at its point of communication with said chamber, said spring bearing against said handle flange, said handle and handle-flange being universally tiltable on said housing member flange to bring said handle portion within said chamber into operating contact with said rod portion and to compress one side of said spring while allowing another portion of said spring to remain open whereby communication is maintained between said exhaust port, said chamber and said closure member-exhaust outlet.

4. In a control valve, a housing, a rod reciprocably mounted within said housing and carrying a valve member, an exhaust port positioned to be closed by said valve member when said rod is in one position, a chamber formed at one end of said housing, said exhaust port communicating with said chamber, an exhaust outlet communicating with said chamber, said rod having a portion extending into said chamber when said valve is in exhaust-port-closing position, a handle mounted in said chamber for universal tilting movement and having a portion extending into said chamber for operating engagement with said rod portion in response to tilting of said handle, a coil spring surrounding said rod portion within said chamber and surrounding the area of said exhaust port communication with said chamber, said coil spring bearing against said handle portion within said chamber to resist tilting movement thereof, tilting of said handle being effective to move said rod in a direction to unseat the said valve from said exhaust port and to longitudinally compress one portion of said spring while permitting the opposite portion of said spring to remain open and to maintain communication between said exhaust port and said exhaust outlet through said chamber.

References Cited in the file of this patent

UNITED STATES PATENTS

| | | |
|---|---|---|
| 2,075,029 | Duncan, Jr. | Mar. 30, 1937 |
| 2,287,775 | Baker et al. | June 30, 1942 |
| 2,490,996 | Cook | Dec. 13, 1949 |
| 2,530,723 | Pickert | Nov. 21, 1950 |